United States Patent
Williams

(10) Patent No.: US 7,431,125 B2
(45) Date of Patent: Oct. 7, 2008

(54) COMPOSITE MUFFLER FOR USE WITH AIRBORNE AUXILIARY POWER UNIT

(75) Inventor: Nicholas A. Williams, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 522 days.

(21) Appl. No.: 11/187,393

(22) Filed: Jul. 21, 2005

(65) Prior Publication Data

US 2006/0207826 A1 Sep. 21, 2006

Related U.S. Application Data

(60) Provisional application No. 60/662,473, filed on Mar. 15, 2005.

(51) Int. Cl.
*F01N 1/24* (2006.01)
*E04B 1/74* (2006.01)
*E04B 1/88* (2006.01)
*B64D 33/04* (2006.01)

(52) U.S. Cl. .................. 181/214; 181/292; 181/222; 181/256; 244/53 B

(58) Field of Classification Search ................. 181/250, 181/255, 273, 276, 246, 214, 292, 222, 256, 181/288; 244/1 N, 53 B; 228/59; 415/119
See application file for complete search history.

(56) References Cited

U.S. PATENT DOCUMENTS

| | | | | |
|---|---|---|---|---|
| 1,878,424 A | * | 9/1932 | Oldberg | ...................... 181/250 |
| 2,988,302 A | * | 6/1961 | Smith | ............................ 244/15 |
| 4,105,090 A | | 8/1978 | Tachibana et al. | |
| 4,235,303 A | * | 11/1980 | Dhoore et al. | ............... 181/214 |
| 4,239,091 A | | 12/1980 | Negrao | |
| 4,263,982 A | | 4/1981 | Feuling | |
| 4,360,075 A | * | 11/1982 | Blaser et al. | ................. 181/250 |
| 4,509,616 A | * | 4/1985 | Blecherman | ................. 181/214 |
| 4,786,265 A | | 11/1988 | Porter | |
| 4,880,078 A | | 11/1989 | Inoue et al. | |
| 4,977,977 A | | 12/1990 | Von Widmann et al. | |
| 4,979,587 A | * | 12/1990 | Hirt et al. | .................... 181/213 |
| 5,094,640 A | | 3/1992 | Burdick et al. | |
| 5,162,620 A | | 11/1992 | Ross et al. | |
| 5,206,467 A | * | 4/1993 | Nagai et al. | .................. 181/232 |
| 5,321,214 A | * | 6/1994 | Uegane et al. | .............. 181/211 |
| 5,594,216 A | * | 1/1997 | Yasukawa et al. | ........... 181/213 |
| 5,743,488 A | * | 4/1998 | Rolston et al. | ............ 244/53 B |
| 5,869,792 A | * | 2/1999 | Allen et al. | .................. 181/224 |
| 5,892,186 A | * | 4/1999 | Flugger | ...................... 181/252 |
| 5,979,598 A | | 11/1999 | Wolf et al. | |
| 6,116,377 A | * | 9/2000 | Dugan | ........................ 181/272 |
| 6,695,094 B2 | | 2/2004 | Moffat et al. | |

(Continued)

*Primary Examiner*—Edgardo San Martin
(74) *Attorney, Agent, or Firm*—Ingrassia, Fisher & Lorenz, P.C.

(57) ABSTRACT

The present invention provides a composite muffler for use with an auxiliary power unit. The composite muffler comprises a composite outer can, an annular baffle, an acoustic liner, and a thermal barrier. The composite outer can is disposed substantially symmetrically about a longitudinal axis and has an inner peripheral surface defining a cavity. The annular baffle is disposed within the composite outer can cavity, has an opening formed therein, and extends radially outwardly from the opening toward the composite outer can inner peripheral surface. The acoustic liner extends through the annular baffle opening. The thermal barrier is coupled between the annular baffle and the outer can inner peripheral surface.

20 Claims, 4 Drawing Sheets

U.S. PATENT DOCUMENTS 7,273,129 B2 * 9/2007 Harwood .................... 181/256
2001/0008193 A1 7/2001 Moitzheim et al.
2006/0180388 A1 * 8/2006 Brown et al. ................ 181/250

* cited by examiner

COMPOSITE MUFFLER FOR USE WITH AIRBORNE AUXILIARY POWER UNIT

CROSS-REFERENCE TO RELATED APPLICATIONS

This application claims the benefit of U.S. Provisional Application No. 60/662,473, filed on Mar. 15, 2005.

TECHNICAL FIELD

The present invention relates to a muffler for use in an aircraft and, more particularly, to a muffler having a composite outer can.

BACKGROUND

Many modern aircraft are equipped with an airborne auxiliary power unit ("APU") that provides electrical and pneumatic power to various parts of the aircraft. Typically, APUs include mounts, inlet and exhaust, and pneumatic (bleed) and fire containment systems, including systems for detecting and extinguishing fires. FIG. 1 shows a typical APU 100 installed in the tailcone of an aircraft (shown in dashed outline 105). Some of the systems that support the APU 100 include an inlet system 110, a mount system 115, a pneumatic system 120, and an exhaust system 125. The APU exhaust system 125 may perform various functions, including evacuating APU exhaust gas from the aircraft, attenuating exhaust noise, and providing cooling airflow for the aircraft APU compartment when used in conjunction with an eductor system.

To attenuate exhaust noise, the exhaust system 125 may include a muffler section, such as muffler section 130, shown in FIG. 2, which includes an outer can 135 that houses an acoustic liner 140 and a series of baffles 145. Forward 150 and aft 155 end caps terminate the muffler section 130 and are typically attached to components of an eductor system (such as a bellmouth or primary pipe) and to a portion of an axially extending exhaust piping 160.

During aircraft operation, the APU exhaust system 125 is typically exposed to relatively high temperatures, for example, temperatures greater than about 1,000° F. Accordingly, the muffler section 130 is typically fabricated from high temperature steels, such as stainless steel or inconel, and may be externally covered with a thermal blanket 165, as shown in FIG. 2. However, high temperature steels have relatively high densities and thermal blankets are relatively heavy. Consequently, undesirable weight may be potentially added to the aircraft.

Accordingly, there is a need for reducing the weight of the mufflers used in aircrafts equipped with airborne APUs. Furthermore, other desirable features and characteristics of the present invention will become apparent from the subsequent detailed description and the appended claims, taken in conjunction with the accompanying drawings and the foregoing technical field and background

BRIEF SUMMARY

The present invention provides a composite muffler for use with an auxiliary power unit.

In one embodiment, and by way of example only, the composite muffler comprises a composite outer can, an annular baffle, an acoustic liner, and a thermal barrier. The composite outer can is disposed substantially symmetrically about a longitudinal axis and has an inner peripheral surface defining a cavity. The annular baffle is disposed within the composite outer can cavity, has an opening formed therein, and extends radially outwardly from the opening toward the composite outer can inner peripheral surface. The acoustic liner extends through the annular baffle opening. The thermal barrier is coupled between the annular baffle and the outer can inner peripheral surface.

In another embodiment, and by way of example only, the composite muffler comprises a composite outer can, a forward end cap, an aft end cap, an annular baffle, an acoustic liner, and a thermal barrier. The composite outer can is disposed substantially symmetrically about a longitudinal axis and has an inner peripheral surface defining a cavity. The forward end cap is disposed within the composite outer can cavity proximate the forward end and has an opening formed therein. The forward end cap extends radially outwardly from the opening toward the composite outer can inner peripheral surface. The aft end cap is disposed within the composite outer can cavity proximate the aft end and has an opening formed therein. The aft end cap extends radially outwardly from the opening toward the composite outer can inner peripheral surface. The annular baffle is disposed within the composite outer can cavity between the forward and aft end caps and has an opening formed therein. The annular baffle extends radially outwardly from the opening toward the composite outer can inner peripheral surface. The acoustic liner extends through the forward end cap opening, the aft end cap opening, and the annular baffle opening. The thermal barrier is coupled between the annular baffle and the outer can inner peripheral surface and extends between the forward and aft end caps along the outer can inner peripheral surface.

In still another embodiment, and by way of example only, the composite muffler comprises a composite outer can, an annular baffle, an acoustic liner, and a thermal barrier. The composite outer can is disposed substantially symmetrically about a longitudinal axis, has an inner peripheral surface defining a cavity, and comprises a fabric impregnated with resin. The annular baffle is disposed within the composite outer can cavity and has an opening formed therein. The annular baffle extends radially outwardly from the opening toward the composite outer can inner peripheral surface. The acoustic liner extends through the annular baffle opening. The thermal barrier is coupled between the annular baffle and the outer can inner peripheral surface, and comprises a powder/filament mixture.

Other independent features and advantages of the composite muffler will become apparent from the following detailed description, taken in conjunction with the accompanying drawings which illustrate, by way of example, the principles of the invention.

BRIEF DESCRIPTION OF THE DRAWINGS

The following drawings are illustrative of the particular embodiments of the invention and therefore do not limit its scope. They are presented to assist in providing a proper understanding of the invention. The drawings are not to scale and are intended for use in conjunction with the explanations in the following detailed descriptions. The present invention will hereinafter be described in conjunction with the appended drawings, wherein like reference numerals denote like elements, and.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 3:
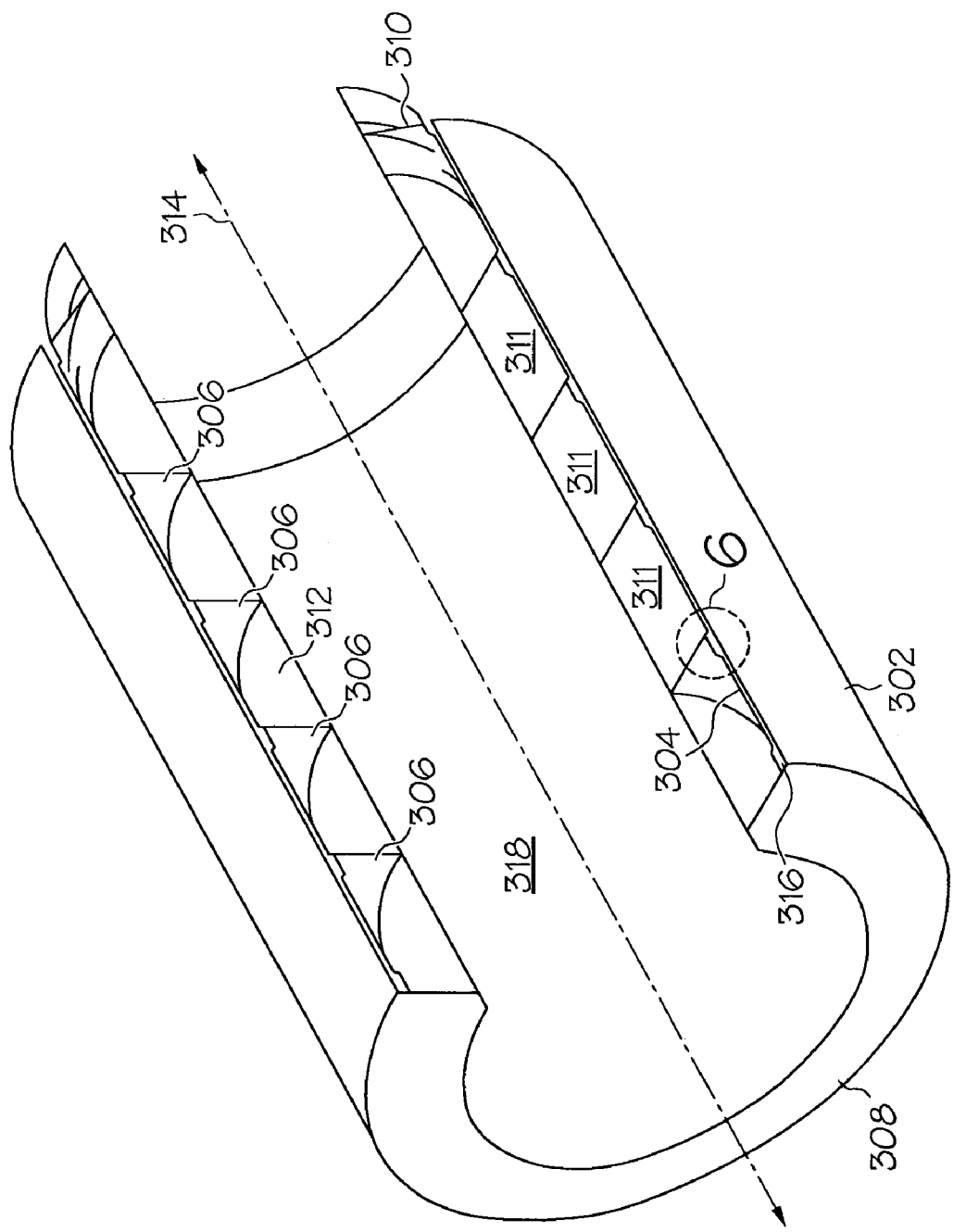
FIG. 3 is a perspective, cutaway view showing an exemplary embodiment of a composite muffler.

Turning now to FIG. 3, a cut-away view of an exemplary muffler section 300 is provided. The muffler section 300 includes a composite outer can 302, a thermal barrier 304, a plurality of baffles 306, and forward and aft end caps 308, 310. Each of the baffles 306 and end caps 308, 310 has an opening formed therein through which an acoustic liner 312 extends. Moreover, the baffles 306 and end caps 308, 310 are spaced apart from one another to form a plurality of acoustic chambers 311.

The composite outer can 302 is disposed substantially symmetrically about a longitudinal axis 314 and includes an inner peripheral surface 316 that defines a cavity 318. The inner peripheral surface 316 preferably has a diameter that is sufficient to provide space to accommodate the theremal barrier 304, acoustic liner 312, and the baffles 306 therein. As shown in FIG. 3, the outer can 302 is generally cylindrical, however, it will be appreciated that the outer can 302 may have any one of numerous other suitable shapes.

The outer can 302 is constructed of composite materials using known techniques. In a preferred embodiment, the composite outer can 302 is made of a fabric impregnated with a resin. Examples of suitable materials from which the fabric may be made include aramid, boron, carbon (graphite), glass, and combinations thereof. Suitable resins include, but are not limited to, epoxy, phenolic, pek (polyetherketone), peek (polyetheretherketone), pps (polyphenylene sulfide), pas (polyarylsulfone), and polyamide-imide.

In another exemplary embodiment, a prepreg woven tape is used to fabricate the composite outer can 302. The tape is wound in overlapping layers with the helical angle alternating each layer. The composite outer can 302 may also be constructed using filament winding methods. Alternatively, a wet layup of the materials may be used in lieu of the prepreg design.

The composite outer can 302 preferably has a thickness that meets structural and fire resistance requirements of a particular application. In one exemplary embodiment, the thickness is based on the ply count (i.e., layers), and the outer can 302 has a ply count of between four and six, resulting in a thickness of between about 0.060-inches and about 0.090-inches.

The thermal barrier 304 is coupled to the composite outer can inner peripheral surface 316 and is configured to provide thermal insulation between the baffles 306, end caps 308, 310, and the composite outer can 302 and between the outer can 302 and hot air that may be present in the acoustic chambers 311. Preferably, the thermal barrier 304 is a substantially tubular, continuous piece that has an inner peripheral diameter that is sufficiently sized to accommodate the forward end cap 308, the aft end cap 310, and baffles 306.

Additionally, the thermal barrier 304 has a thickness that provides sufficient thermal isolation such that the high temperatures to which the outer can 302 may be exposed do not exceed the operational temperature limit of the materials, particularly, the resin, used in the fabrication of the outer can 302. In one exemplary embodiment, the thermal barrier 304 has a uniform thickness along its length. In another exemplary embodiment in which greater heat isolation is needed in the areas in which the outer can 302 and the forward end cap 308, the aft end cap 310, and baffles 306 are coupled; thus, the thermal barrier 304 does not have a uniform thickness along its length. In this regard, the thermal barrier 304 may have a thickness where it interfaces with the end caps 308, 310, baffles 306 and outer can 302 that is greater than the thickness between the end caps 308, 310 and baffles 306, such as shown in FIG. 3.

Figure 1:
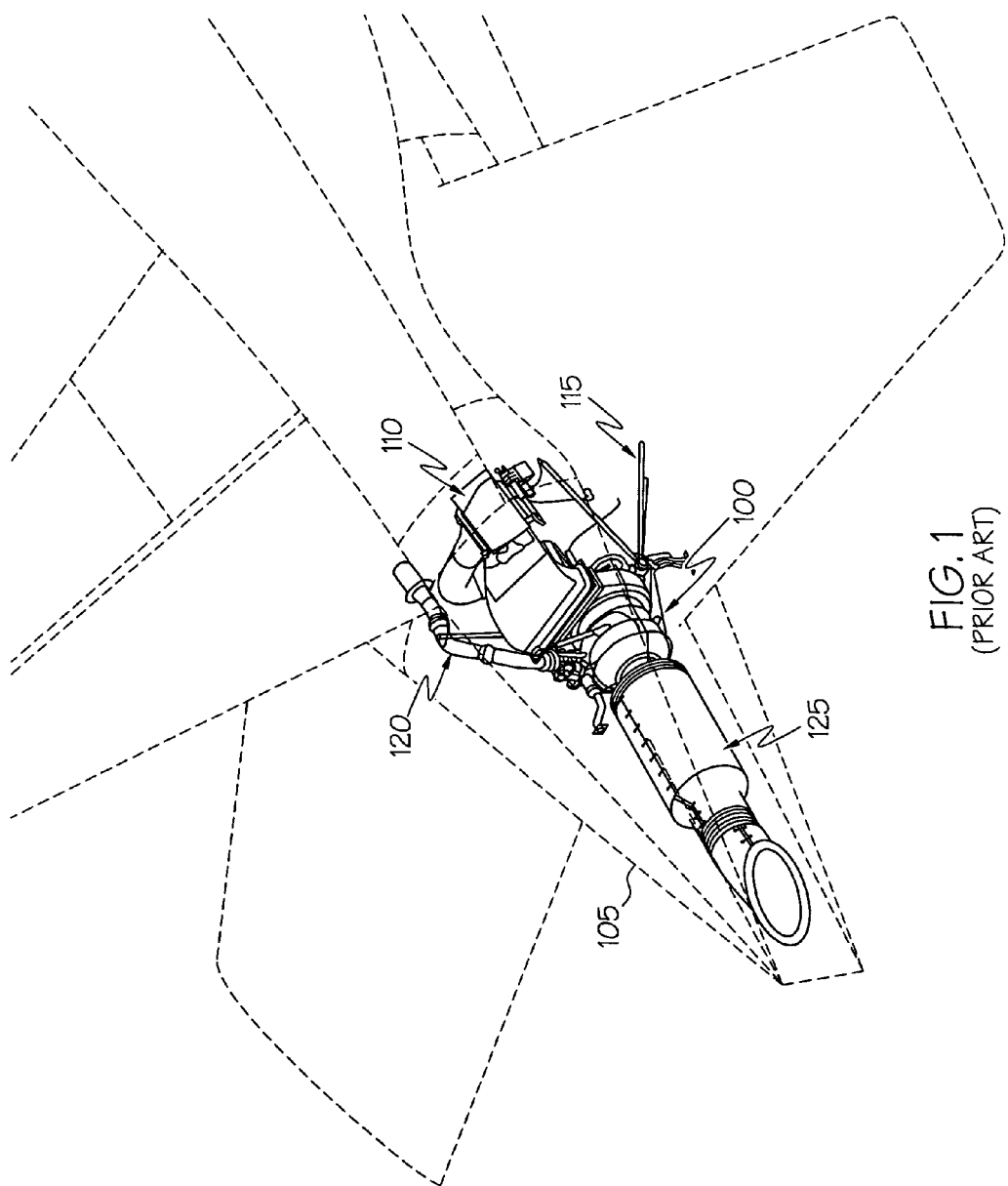
FIG. 1 shows a conventional airborne auxiliary power unit ("APU") installed in a tailcone of an aircraft.
Figure 2:
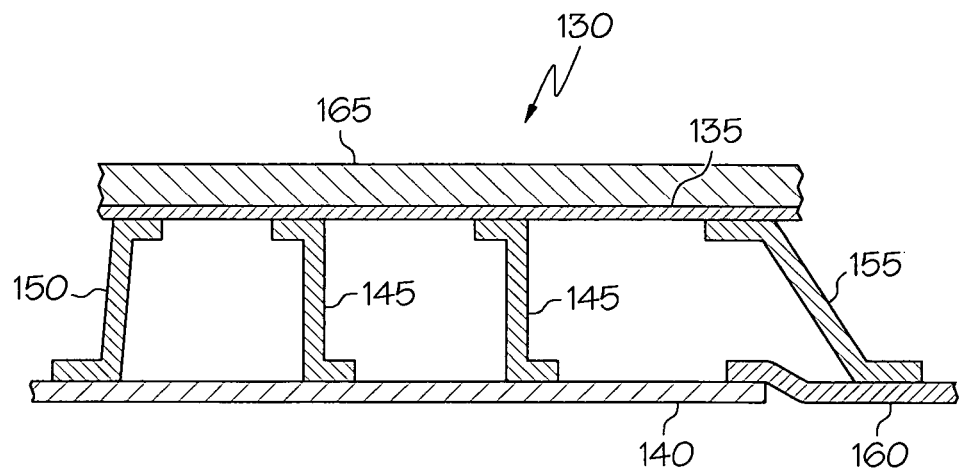
FIG. 2 is a cross-sectional view of a conventional muffler section that may be implemented into the APU depicted in FIG. 1.
Figure 4:
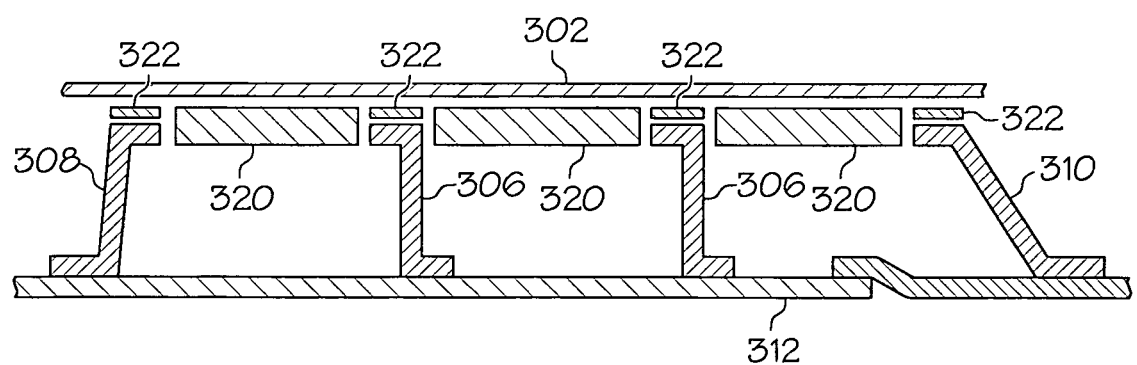
FIG. 4 is a cross-sectional view of an exemplary muffler section according to an embodiment of the invention.

In still another exemplary embodiment, the thermal barrier 304 is constructed from multiple pieces. For example, as illustrated in FIG. 4, two sets of segments 320, 322 may be used, where the segments of the first set 320 are disposed between the end caps 308, 310 and baffles 306 and the segments of the second set 322 are disposed between each of the end caps 308, 310 and the outer can 302 and the baffles 306 and the outer can 302. The first set segments 320 each have a uniform thickness along its length that is suitable for isolating heat that may be in the muffler 300 from the outer can 302, and the second set segments 322 each have a uniform thickness along its length that is greater than the thicknesses of the first set segments 320 to provide increased thermal isolation between the end caps 308, 310, baffles 306 and the outer can 302.

Figure 5:
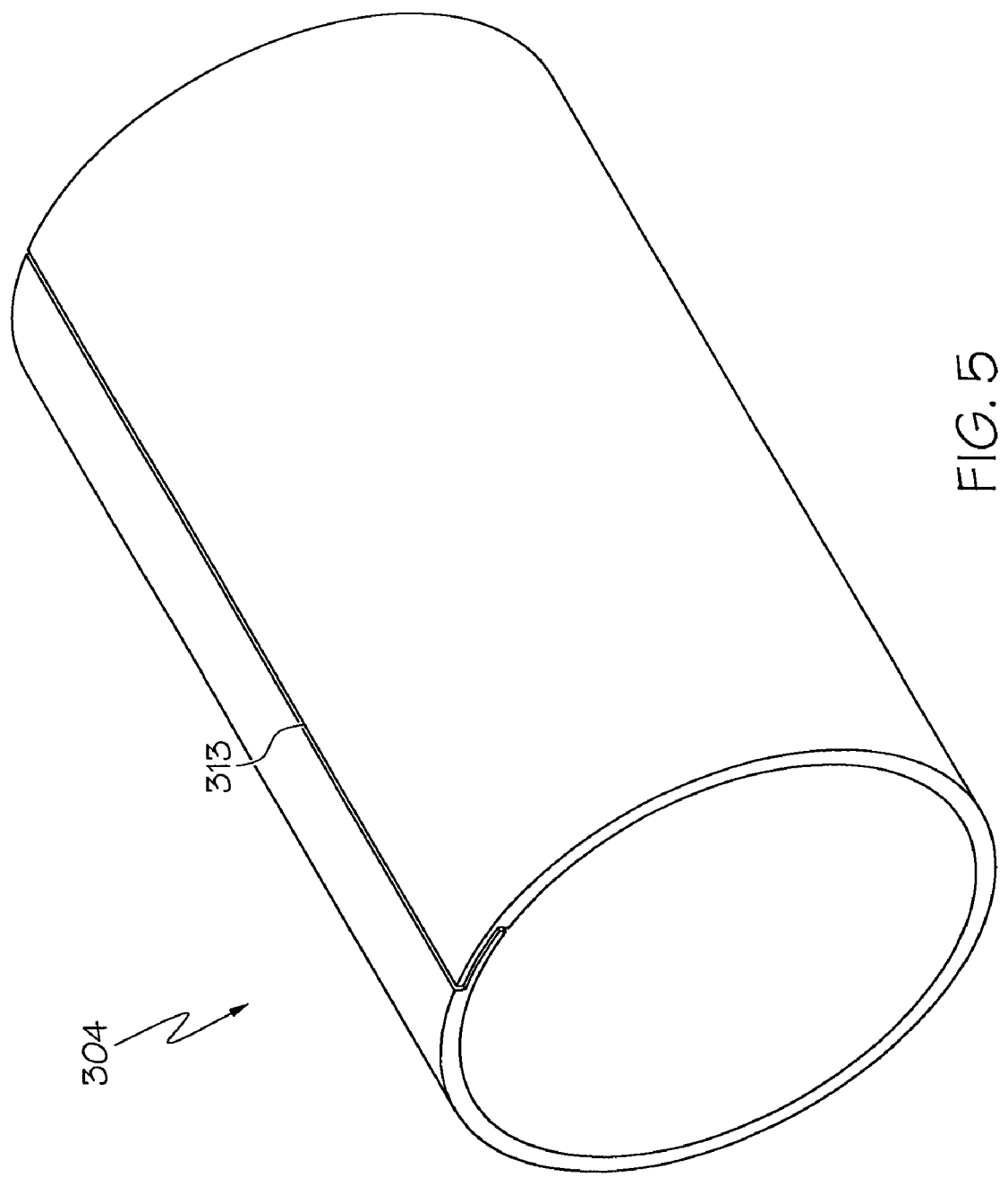
FIG. 5 is an isometric view of an exemplary thermal barrier that may be used in the composite muffler depicted in FIG. 3.

In some cases, the materials used to manufacture the forward end cap 308, the aft end cap 310, and baffles 306, and the material used for the thermal barrier 304 have different coefficients of thermal expansion. For these cases, a lap joint 313 is preferably incorporated into the thermal barrier 304, as shown in FIG. 5. The lap joint 313 extends along the length of the thermal barrier 304 and provides a gap that allows the thermal barrier 304 to expand. If the lap joint 313 is included, the thermal barrier 304 is not bonded directly to the outer can 302 thereby allowing accommodation of the thermal gradients present in the muffler 300.

Depending on the particular configuration and the material selection, the thermal barrier 304 may be molded or cast into a particular shape, assembled from thin sheet layers, or machined. In a preferred embodiment, the thermal barrier 304 is constructed of a powder/filament mixture of amorphous silica, metal oxides, and glass filaments. One such material is sold under the name MICROTHERM®, manufactured by Microtherm International Limited of Wirral, United Kingdom. However, it will be appreciated that any other type of suitable thermal-resistant material may alternatively be used.

Figure 6:
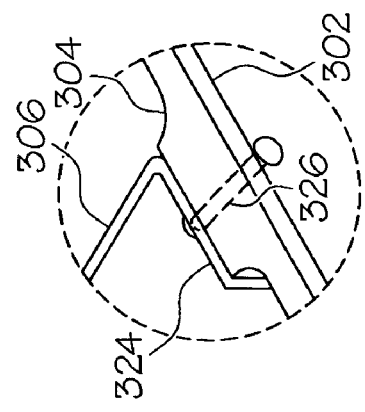
FIG. 6 is a close up view of one type of attachment of the baffle to the composite outer skin.

As briefly mentioned above, the forward end cap 308, the aft end cap 310 and each baffle 306 are coupled to and extend from the composite outer can 302. It will be appreciated that the components may be coupled to the outer can 302 by any one of numerous manners. In one example, rivets 326 are used to couple the components and the outer can 302. As shown in FIG. 6, the baffle 306 (or alternatively, one of the end caps 308, 310) includes a leg 324 that extends axially therefrom and that is configured to contact the thermal barrier 304. The leg 324 preferably extends circumferentially around the baffle 306. The rivets 326 are then driven through the leg 324, the thermal barrier 304 and the outer can 302 and secured between the leg 324 and outer can 302. In this regard, the rivets 326 can be removed and the outer can 302 can be replaced when replacement is needed or desired. It will be appreciated that the rivets 326 may be disposed in any suitable pattern, such as, for example, in an annular pattern. Preferably, the rivets 326 are capable of withstanding relatively high temperatures and conduct a minimal amount of heat to the composite outer can 302. Other fastening techniques may also be used, such as threaded fasteners, bonding methods, or a combination, in lieu of, or in conjunction with, the rivets 326 to assemble the muffler 300.

There has now been provided an APU muffler which incorporates a light-weight fiber reinforced plastic composite outer can and thermal barrier. The thermal barrier isolates the composite outer can from the high temperature exhaust gases and other components of the muffler thereby extending a service life of the muffler.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A composite muffler for use in an auxiliary power unit exhaust system, the composite muffler comprising:
    a composite outer can disposed substantially symmetrically about a longitudinal axis, the outer can having an inner peripheral surface defining a cavity;
    an annular baffle disposed within the composite outer can cavity and having an outer peripheral surface and an opening formed therein, the annular baffle extending radially outwardly from the opening toward the composite outer can inner peripheral surface;
    an acoustic liner extending through the annular baffle opening; and
    a thermal barrier coupled between the annular baffle outer peripheral surface and the outer can inner peripheral surface.

2. The composite muffler of claim 1, wherein the composite outer can comprises a fabric impregnated with a resin.

3. The composite muffler of claim 2, wherein the fabric comprises material selected from the group consisting of aramid, boron, graphite carbon, glass, and combinations thereof.

4. The composite muffler of claim 2, wherein the resin is selected from the group consisting of epoxy, bismaleimide, phenolic, polyetherketone, polyetheretherketone, polyphenylene sulfide, polyarylsulfone, and polyamide-imide.

5. The composite muffler of claim 1, wherein the annular baffle is one of a plurality of annular baffles that are disposed within the composite outer can cavity and spaced apart from one another to form acoustic chambers therebetween, and wherein the thermal barrier has a first thickness proximate each of the annular baffles, and a second thickness between each baffle that is less than the first thickness.

6. The composite muffler of claim 1, wherein the thermal barrier comprises a powder/filament mixture.

7. The composite muffler of claim 6, wherein the powder/filament mixture includes amorphous silica, metal oxides, and glass filaments.

8. The composite muffler of claim 1, wherein the annular baffle is coupled to the composite outer can by one or more rivets.

9. The composite muffler of claim 1, wherein the composite outer can includes a forward end and an aft end, the muffler further comprising:
    a forward end cap disposed within the composite outer can cavity proximate the forward end and having an opening formed therein, the annular baffle extending radially outwardly from the opening toward the composite outer can inner peripheral surface;
    an aft end cap disposed within the composite outer can cavity proximate the aft end and having an opening formed therein, the annular baffle extending radially outwardly from the opening toward the composite outer can inner peripheral surface;
    the acoustic liner disposed at least partially within the forward and aft end cap openings.

10. The composite muffler of claim 9, wherein the thermal barrier has a first section and a second section, the first section disposed between the baffle and the outer can and having a first thickness, the second section disposed between the baffle and one of the forward and aft end caps having a second thickness that is less than the first thickness.

11. A composite muffler for use in an auxiliary power unit exhaust system, the composite muffler comprising:
    a composite outer can disposed substantially symmetrically about a longitudinal axis, the outer can having an inner peripheral surface defining a cavity;
    a forward end cap disposed within the composite outer can cavity proximate the forward end and having an opening formed therein, the forward end cap extending radially outwardly from the opening toward the composite outer can inner peripheral surface;
    an aft end cap disposed within the composite outer can cavity proximate the aft end and having an opening formed therein, the aft end cap extending radially outwardly from the opening toward the composite outer can inner peripheral surface;
    an annular baffle disposed within the composite outer can cavity between the forward and aft end caps and having an opening formed therein and an outer peripheral surface, the annular baffle extending radially outwardly from the opening toward the composite outer can inner peripheral surface;
    an acoustic liner extending through the forward end cap opening, the aft end cap opening, and the annular baffle opening; and
    a thermal barrier coupled between the annular baffle outer peripheral surface and the outer can inner peripheral surface.

12. The composite muffler of claim 11, wherein the composite outer skin comprises a fabric impregnated with a resin.

13. The composite muffler of claim 11, wherein the fabric comprises a material that is selected from the group consisting of aramid, boron, graphite carbon, glass, and combinations thereof.

14. The composite muffler of claim 11, wherein the resin is selected from the group consisting of epoxy, bismaleimide, phenolic, polyetherketone, polyetheretherketone, polyphenylene sulfide, polyarylsulfone, and polyamide-imide.

15. The composite muffler of claim 11, wherein the thermal barrier comprises a powder/filament mixture.

16. The composite muffler of claim 15, wherein the powder/filament mixture comprises amorphous silica, metal oxides, and glass filaments.

17. A composite muffler for use in an auxiliary power unit exhaust system, the composite muffler comprising:
- a composite outer can disposed substantially symmetrically about a longitudinal axis, the outer can having an inner peripheral surface defining a cavity, the composite outer can comprising a fabric impregnated with resin;
- an annular baffle disposed within the composite outer can cavity and having an opening formed therein and an outer peripheral surface, the annular baffle extending radially outwardly from the opening toward the composite outer can inner peripheral surface;
- an acoustic liner extending through the annular baffle opening; and
- a thermal barrier coupled between the annular baffle outer peripheral surface and the outer can inner peripheral surface, the thermal barrier comprising a powder/filament mixture.

18. The composite muffler of claim 17, wherein the fabric comprises a material that is selected from the group consisting of aramid, boron, graphite carbon, glass, and combinations thereof.

19. The composite muffler of claim 17, wherein the resin is selected from the group consisting of epoxy, bismaleimide, phenolic, polyetherketone, peek polyetheretherketone, polyphenylene sulfide, polyarylsulfone, and polyamide-imide.

20. The composite muffler of claim 17, wherein the powder/filament mixture comprises amorphous silica, metal oxides, and glass filaments.

* * * * *